United States Patent
Krebs

(10) Patent No.: US 7,209,039 B2
(45) Date of Patent: Apr. 24, 2007

(54) DECORATIVE SURFACE COVERING WITH EMBEDDED RF ANTENNA AND RF SHIELD AND METHOD FOR MAKING THE SAME

(75) Inventor: Robert R. Krebs, Georgetown, TX (US)

(73) Assignee: Illinois Tool Works Inc., Glenview, IL (US)

( * ) Notice: Subject to any disclaimer, the term of this patent is extended or adjusted under 35 U.S.C. 154(b) by 302 days.

(21) Appl. No.: 10/797,320

(22) Filed: Mar. 8, 2004

(65) Prior Publication Data

US 2004/0224135 A1    Nov. 11, 2004

Related U.S. Application Data

(60) Provisional application No. 60/468,967, filed on May 8, 2003.

(51) Int. Cl.
*G08B 13/14* (2006.01)
(52) U.S. Cl. .................. 340/572.1; 340/10.1; 343/872
(58) Field of Classification Search .. 340/572.1–572.9, 340/10.1; 343/872, 873; 235/462.13
See application file for complete search history.

(56) References Cited

U.S. PATENT DOCUMENTS

| 5,241,299 | A | * | 8/1993 | Appalucci et al. ....... 340/572.3 |
| 5,387,900 | A | * | 2/1995 | Plonsky et al. .......... 340/572.4 |
| 5,528,222 | A | * | 6/1996 | Moskowitz et al. ...... 340/572.7 |
| 5,920,290 | A | * | 7/1999 | McDonough et al. ........ 343/873 |
| 5,972,156 | A | | 10/1999 | Brady et al. ................. 156/280 |
| 5,989,668 | A | | 11/1999 | Nelson et al. ................. 428/50 |
| 6,395,373 | B2 | | 5/2002 | Conti et al. ................. 428/138 |
| 6,495,265 | B1 | | 12/2002 | Krebs et al. ................. 428/460 |
| 2002/0190132 | A1 | | 12/2002 | Kayanakis |
| 2003/0174099 | A1 | * | 9/2003 | Bauer et al. ................. 343/893 |
| 2005/0001785 | A1 | * | 1/2005 | Ferguson et al. ........... 343/895 |
| 2005/0066513 | A1 | * | 3/2005 | Kayanakis et al. ........ 29/592.1 |

FOREIGN PATENT DOCUMENTS

| WO | WO 02/41237 A1 | 5/2002 |
| WO | WO 03/038777 A1 | 5/2003 |

* cited by examiner

*Primary Examiner*—Phung T. Nguyen
(74) *Attorney, Agent, or Firm*—Fletcher Yoder

(57) ABSTRACT

A technique is provided for printing an RFID antenna using conductive ink on a substrate and incorporating that substrate as a layer in a decorative surface such as a high pressure decorative laminate. In addition, a technique is provided for incorporating a conductive mesh into a surface, such as a high pressure decorative laminate, to form an RFID shield which prevents stray signals from reaching an RFID antenna. A technique is also provided for integrating both a printed antenna and conductive mesh shield into a single surface, such as a decorative surface, to allow the reading of desired RFID tags while preventing the reading of undesired RFID tags.

43 Claims, 6 Drawing Sheets

DECORATIVE SURFACE COVERING WITH EMBEDDED RF ANTENNA AND RF SHIELD AND METHOD FOR MAKING THE SAME

CROSS-REFERENCE TO RELATED APPLICATIONS

The present application is based on and claims priority of U.S. Provisional Patent Application No. 60/468,967, filed on May 8, 2003, and entitled DECORATIVE SURFACE COVERING WITH EMBEDDED RF ANTENNA AND RF SHIELD AND METHOD FOR MAKING SAME.

BACKGROUND OF THE INVENTION

The present technique relates generally to the formation of antennae or other conductive structures inside a solid medium. More specifically, the present technique relates to the formation of a conductive antenna within a layered structure, such as a decorative surface covering or laminate.

In the field of asset tracking and inventory, various technologies have emerged which improve both the accuracy and speed by which inventories are tracked relative to fully manual techniques. For example, bar code readers may be used to optically read a bar code label on an asset, allowing that label, and presumably the asset, to be identified automatically by reference to a database which associates bar codes with assets. Information about the product, such as price, may then be returned and other information, such as an inventory count, may be updated.

Such systems have limitations, however. For example, such a scanning process requires a time-consuming sequential scanning process, either by hand or by an automated feeder, which allows only one label to be read at a time. Bar code reading also requires an unobstructed line of sight and a specific orientation of the label to the reader in order for the read to be successful. Because of their optic nature, bar codes are poorly suited for harsh environments, such as wet, dirty, oily, or other harsh environments, which might obscure or damage the bar code label. In addition, bar codes provide only a limited amount of information, usually limited to asset identification. Finally, bar code labels are relatively easy to counterfeit using readily available labels and the printing technology available on a personal computer.

Because of these various limitations or hazards associated with bar code technology and techniques, radio frequency identification (RFID) tags or transponders are attracting interest for use in asset identification and tracking. The RFID system uses radio waves, rather than optical signals, to transfer information from the asset to a reader. The RFID tag typically includes an antenna and a radio communication integrated circuit (IC), or chip. The chip contains electronic memory circuitry which may be read via low wattage radio waves by a remote reader, also known as an interrogator. The tag may also be written to by a remote writer. Because the chip may be written to as well as read, it may be updated with new or additional information throughout the asset lifecycle, such as from manufacture to point of sale.

The RFID system provides several advantages, including being able to read multiple tags simultaneously, including obstructed tags or tags which are otherwise outside the line of sight. Likewise, tags are less likely to be damaged than labels and are significantly more difficult to counterfeit. In addition, RFID tags can be read without human intervention and the delays associated with such intervention. The lack of human intervention is of particular value in applications such as asset tracking where it may be desirable to register the movement or absence of an asset without having an employee manually scan the asset. For example, RFID tags may be utilized for automated inventory tracking, such as in a store, at a warehouse or storage site, or during shipping. In such an embodiment, RFID tags may be associated with each good or asset to be tracked, and antennas strategically placed in the environment may allow one or more readers to, continuously or periodically, determine which tags are present and where they are located relative to the antenna.

While this technique may be useful in some contexts, it also presents a variety of problems. For example, placement of a copper or other metallic antenna structure, such as on a shelf, may disrupt the smoothness of a surface and be aesthetically displeasing. In addition, such exposed placement may make the antenna susceptible to damage from the placement or movement of objects on the shelf. In addition, in a retail or commercial setting, customers or staff may tamper with or damage the exposed antenna.

Furthermore, an antenna may retrieve the RFID tag information from other nearby tags, such as on other shelves or aisles. In such an instance an RFID tag may be read or registered multiple times by different antennas, making it difficult to determine the location of the tag. A technique for incorporating an RFID antenna into a decorative or functional surface or shelf and for isolating an RFID antenna from spurious signals is therefore desirable.

BRIEF DESCRIPTION OF THE DRAWINGS

The foregoing and other advantages and features of the invention will become apparent upon reading the following detailed description and upon reference to the drawings in which.

DETAILED DESCRIPTION OF SPECIFIC EMBODIMENTS

The field of asset and product tracking and management has evolved substantially as technology has advanced. In particular, manual and paper driven processes are now largely obsolete in view of computerized inventory and tracking databases capable of tracking and maintaining product information. Various automated or partially automated technologies provide an interface with such databases, allowing information, such as product quantity on hand, location, or price, to be provided or retrieved to a database. Bar codes and bar code readers are an example of one such partially automated technology whereby an operator may optically read a coded label on a product to access a database and facilitate a transaction, such as a purchase. Optical readers, however, possess several shortcomings including their requirement of an unobstructed line of sight between the reader and the label, their unsuitability for harsh environments which may damage or obscure a label, and the ease with which a label may be counterfeited or tampered. In addition, optical readers are generally limited to processing a single product at a time, making them unsuitable for large scale or continuous operations, such as for continuous inventory management.

Another technology which addresses many of these issues is radio frequency identification (RFID) which employs a tag, comprising an integrated circuit or chip and an antenna, and a reader or interrogator, also comprising an antenna and circuitry for reading an electronic memory circuit on the chip. A writer, which may be integrated with the reader, may also be present to update or rewrite the memory on the chip. The memory circuit on the chip may contain various information such as product identifiers, product history, price, and so forth. Because RFID technology relies upon radio frequency technology, it does not require line of sight and is not limited to processing a single product at a time. Indeed, using RFID technology, 10 or more tags may be simultaneously read by a reader. These various factors, among others, make RFID techniques suitable for providing continuous inventory management in retail, storage, or shipping contexts, as opposed to optical techniques which may only update an inventory database discontinuously, such as at the point of sale.

Figure 1:
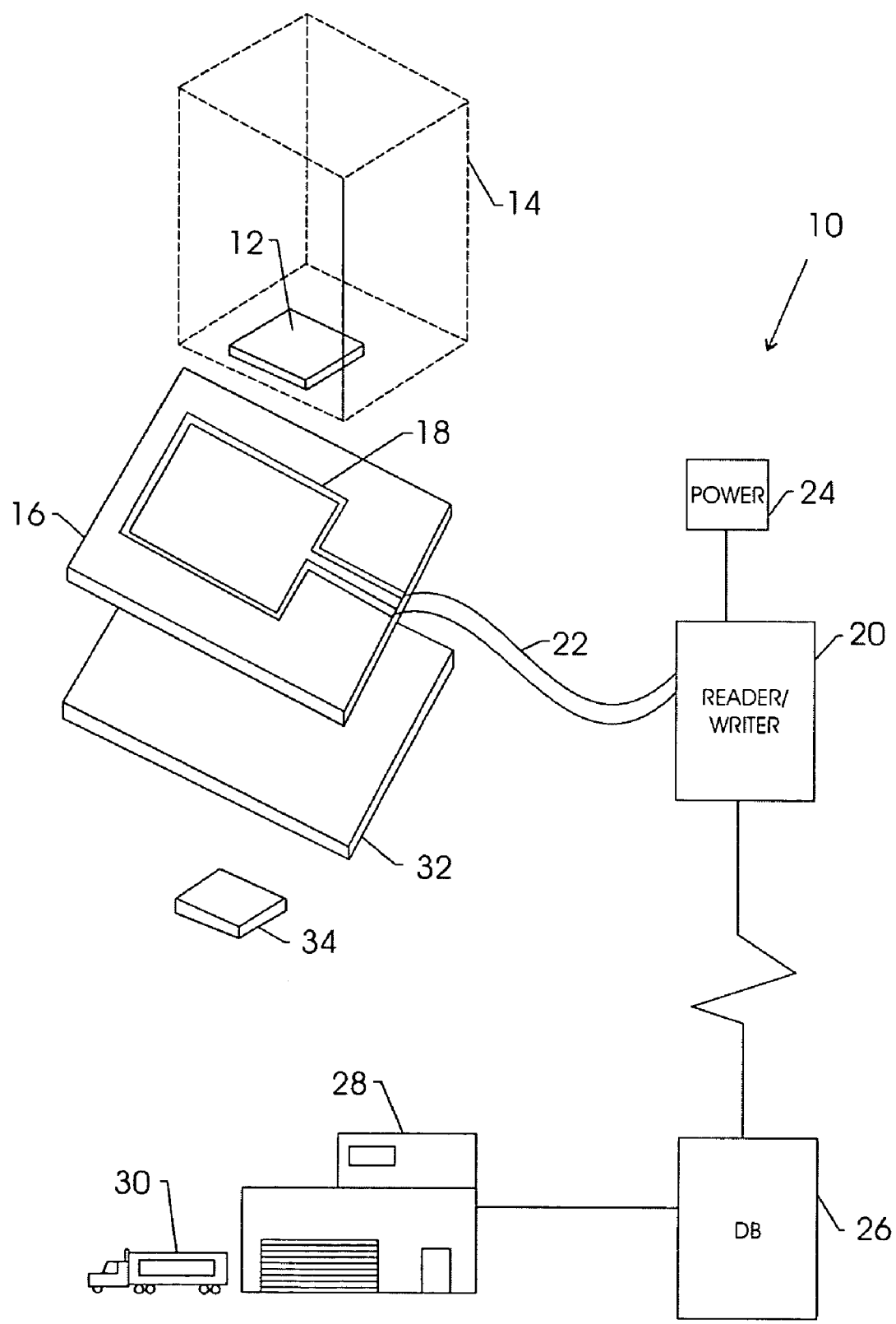
FIG. 1 is a block diagram depicting an RFID inventory tracking and supply system including an RFID antenna and RFID shield made and used in accordance with the present technique.

For example, referring to FIG. 1, an exemplary RFID inventory management system 10, suitable for a retail, a warehouse, or a shipping environment, is depicted. A tag 12 incorporating an integrated circuit or chip and a tag antenna may be present and incorporated in a product 14 or the product's packaging. The tag 12 may be either active, i.e., self-powered, in which case the tag 12 also includes a power supply, such as a battery, or passive, in which case the tag 12 is not self-powered. A passive tag 12 is instead powered by a low-level radio frequency electromagnetic field generated by an antenna which serves as a "carrier" of power from the reader to the passive tag.

The product 14 may be proximate to a surface 16 which incorporates a reader antenna 18 which is in communication with a reader 20 or reader/writer, i.e., a transceiver, via wires 22 or fiber optic cables, as shown, or via wireless means, such as a radio link. The surface 16 may be oriented horizontal to the product 14, such as part of a shelf, floor, or ceiling, or vertical to the product 14, such as a side or back panel of a storage unit or a wall. Other relative orientations of the surface 16, such as diagonal, may be possible depending on the fixture or feature incorporating the surface 16. If the tag 12 is passive, a power supply 24 may be present to provide power to the antenna 18 and, from the field thereby produced, to the tag 12. Though the power supply 24 is depicted as connecting to the antenna 18 via the reader 20, it may be directly connected to the antenna 18 instead.

The reader 20 receives information from the antenna 18 which may then be conveyed to a tracking database 26 either by wires or by wireless means. The tracking database 26 may communicate with a warehouse 28 or other storage facility, such as a stock room, to facilitate restocking or reordering based upon the inventory situation. In addition, misplaced goods may be readily identified and located from other in-store locations based upon the location of the antenna 18, allowing such misplaced goods to be found and correctly stocked. Goods in transit, such as via truck 30, may also be continuously tracked to the extent that readers 20 and surfaces 16 incorporating antennas 18 are present in the truck or other transportation. It should be noted that the surface 16 in the truck 30 or transportation may be incorporated into a shelf or may be incorporated into a panel forming the floor, ceiling, or side of the vehicle. Alternatively, the surface 16 with the embedded antenna 18 may be used to construct a checkout which can register and bill a shopper's purchases without a checker being present.

A radio frequency (RF) shield 32 may also be present capable of blocking signals from proximate tags 34 which may be incidentally read by the antenna 18 though outside the area which antenna 18 is intended to monitor. The shield 32 thereby prevents overcounting of the proximate tags 34, which presumably are being accounted for by a separate antenna 18. In addition, the shield 32 prevents the product containing the proximate tag 34 from being erroneously attributed to a location proximate to the surface 16, which might confuse personnel attempting to locate the product.

In regard to the surface 16 incorporating the antenna 18, the surface 16 may be a decorative surface, i.e., a surface suitable for public display, such as a high pressure decorative laminate, a low pressure laminate (continuous or otherwise), or a thermoplastic sheet, such as vinyl. The surface 16 may also be a functional surface, such as a wear resistant surface. For example, referring to FIG. 2, in one embodiment the surface 16 is a high pressure decorative laminate (HPDL) 40 comprising various bonded layers. In the depicted embodiment, a first core layer 42 with an antenna 18 printed upon it is one layer of the laminate 40. A core layer, as used herein, may be a paper material, such as a dry paper, a resin saturated or untreated kraft paper, a cardboard or cardstock, or a synthetic or plastic-type material, such as polyester or nylon. In one embodiment, the first core layer 42 is a phenolic resin treated, beta-staged sheet of kraft paper.

The antenna 18 may be printed on the first core layer 42 by various techniques, such as by silk screening, flexographic, and gravure techniques, or may be painted on, such as by means of a mask, a template, or a robotic arm. In the present discussion, printing includes not only printing techniques, but also various painting techniques, and, indeed, any technique by which a conductive medium, such as an ink or paint, may be applied in a specified configuration to a substrate. The antenna 18 may be printed on the first core layer 42 using a conductive medium, such as a silver-based ink or a carbon-based ink, i.e., an ink comprising electronic conducting organic polymers, fullerenes, short-length nanotubes, and so forth. For example, in one embodiment, the conductive medium is a silver-based ink suitable for silk screening, such as Noelle E-903-06, produced by Noelle Industries, Inc. The antenna 18 may be printed up to an edge of the laminate 40, thereby providing a conductive edge connection to the antenna 18. Alternately, two or more holes 44 may be formed in the first core layer 42 to reach the antenna 18, such as by drilling or laser engraving. The holes 44 may be filled with a conductive material, such as the conductive ink or a conductive adhesive, to create conductive contacts to the antenna 18.

A second core layer 46 may overlay the first core layer 42 and the antenna 18. If present, the second core layer 46 may protect the antenna 18, reduce any surface contour added by the antenna 18, and add rigidity to the laminate 40. A third core layer 48 may also be added to offer further protection of the antenna 18, to further reduce or eliminate surface contour attributable to the antenna 18, and to add additional rigidity to the laminate 40. Indeed, any number of additional core layers may be added, depending on the desired thickness of the laminate. A decorative layer 50, such as a pattern sheet containing a pattern, design, or solid color, may also be included to increase the decorative value of the laminate 40. While the antenna 18 has been discussed as being printed on a core layer 42, it may instead be printed on the decorative layer 50. In one embodiment, the antenna 18 may be printed on an interior side of the decorative layer 50. For example, an antenna 18 printed on an interior side of a decorative layer 50 may be suitable for forming low pressure laminates, such as by bonding the decorative layer 50 to a suitable substrate, such as particle board, medium density fiberboard, composite substrates incorporating wood or wood fibers and plastics, and so forth.

One or more wear layers 52, such as a layer of melamine impregnated paper, may also be included to provide desired surface characteristics, such as abrasion, wear, chemical, thermal, light, water, or shock resistance. When fully heated and pressed, as discussed below, the wear layer 52 may become translucent, fully exposing the decorative layer 50, if present. By incorporating the antenna 18 in the layers of the laminate 40, the antenna 18 no longer detracts from the appearance of the surface, creating a more decorative, aesthetically pleasing appearance than an exposed antenna or antenna outline might.

Figure 3:
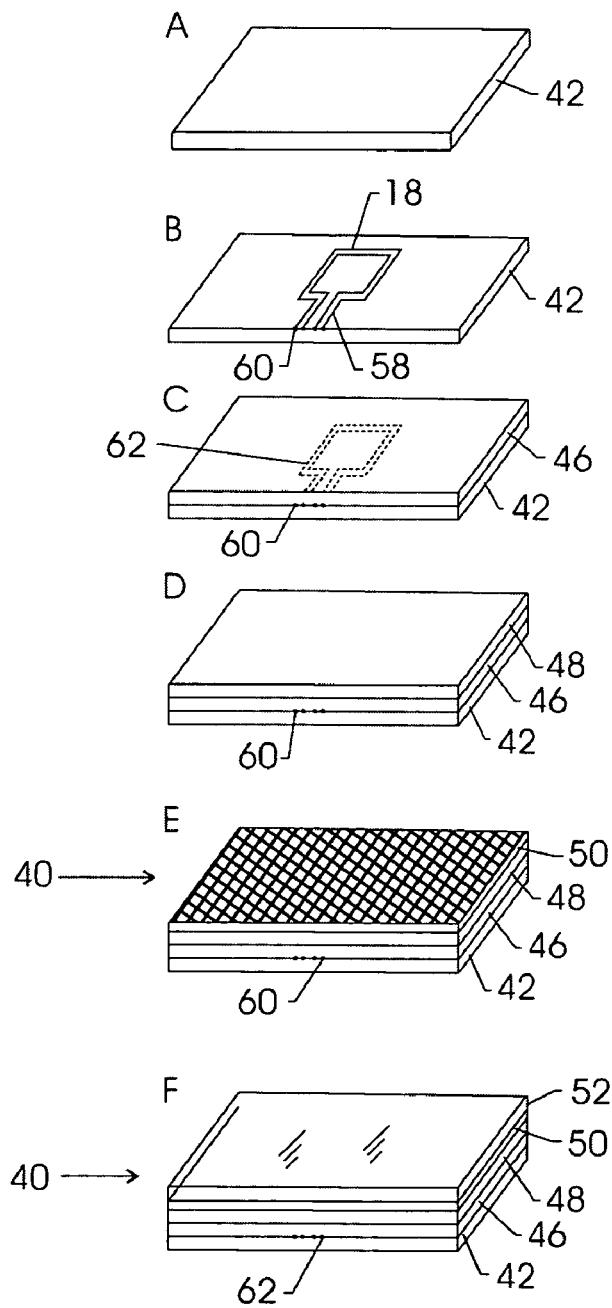
FIG. 3A through 3F depict a method of manufacturing the decorative surface depicted in FIG. 2.

Referring to FIG. 3, steps for making the laminate 40 are depicted. In FIG. 3A, the first core layer 42 is depicted. The antenna 18 is printed onto the first core layer 42 as depicted in FIG. 3B, and may be subsequently dried or cured. Leads 58 of the antenna 18 may be printed up to the edge of the first core layer 42 to form edge contacts 60. A second core layer 46 may be laid over the first core layer 42, substantially covering the antenna 18 except for the contacts 60, as depicted in FIG. 3C. Some surface contour 62 attributable to the antenna 18 may be present on the second core layer 46, depending on the thickness of the antenna 18 formed by the printing process. A third core layer 48 may be laid over the second core layer 46, as depicted in FIG. 3D, adding rigidity and thickness to the laminate 40 and further diminishing any surface contour 62 attributable to the antenna 18. A decorative layer 50 may be laid over the third core layer 48, as depicted in FIG. 3E, or the second core layer 46 if no third layer 48 is present, to enhance the decorative value of the surface 40. Alternately, the decorative layer 50 may be laid over one or more additional core layers if these are added over the third layer 48 in order to obtain a desired thickness or rigidity. Additionally, one or more wear layers 52 may be laid over the decorative layer 50, if present, or the top most core layer to provide wear and abrasion resistance, as depicted in FIG. 3F.

After the various layers are stacked, as in FIG. 3F, they may be placed between plates, such as steel plates. The stack is then subjected to temperatures in the range of 121° C. to 160° C. (250° F. to 320° F.) and about 56.24 kg/cm$^2$ to 112.48 kg/cm$^2$ (800 p.s.i. to 1,600 p.s.i) for a time sufficient to consolidate the laminate 40 and cure any resins impregnating the layers, generally about 20 minutes to an hour. In one embodiment the stack is subjected to temperatures in the range of 143° C. to 154° C. (289° F. to 309° F.) and about 70.3 kg/cm$^2$ (1,000 p.s.i.) for 20 to 30 minutes.

Figure 2:
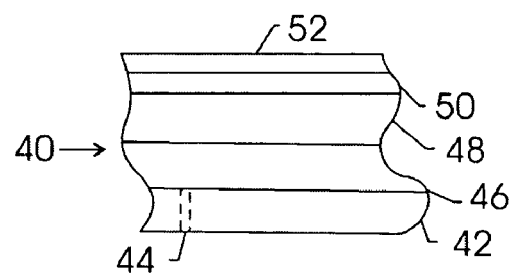
FIG. 2 is a sectional side view depicting a decorative surface incorporating a printed interior antenna in accordance with the present technique.

While the embodiment depicted in FIG. 3 possesses contacts 60 at the edge of the surface 40 for connection to a reader 20, such contacts 60 may be absent and, as depicted in FIG. 2, an additional step of forming contact holes 44 and filling them with a conductive material may be performed. Alternately, the laminate 40 may be trimmed or cut such that edge contacts 60 are present after cutting or such that the printed layer 42 is exposed, providing electrical access to the antenna 18.

Figure 4:
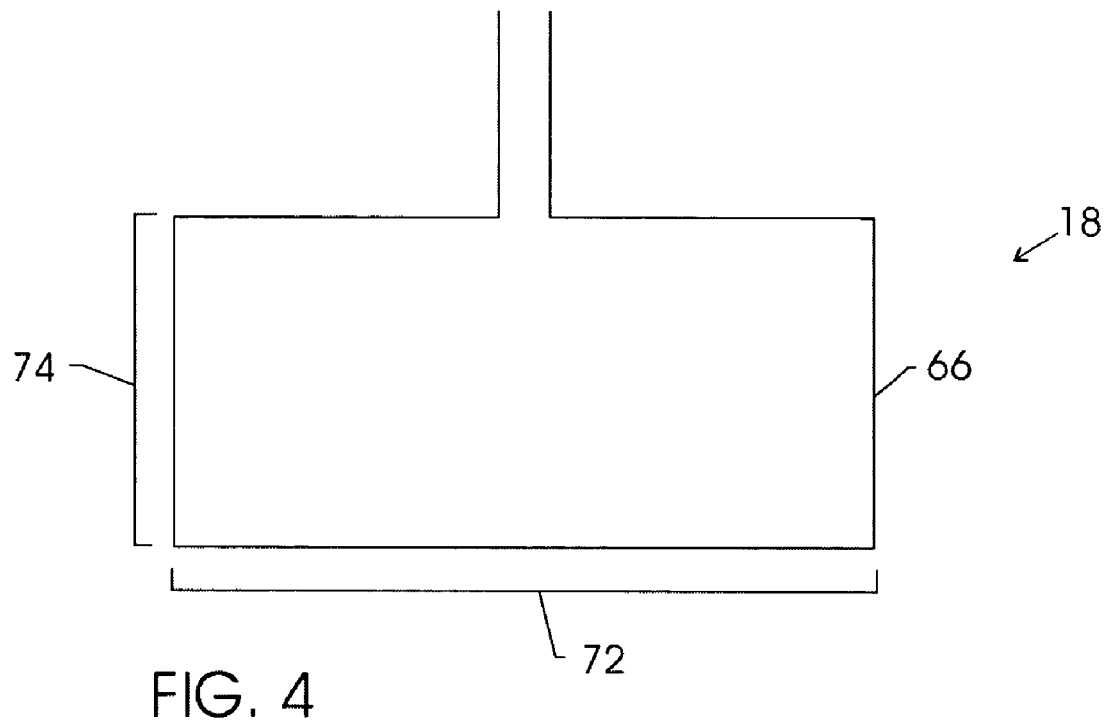
FIG. 4 is one embodiment of an antenna configuration in accordance with the present technique.

The antenna 18 which is printed onto the antenna core layer 42 may have a variety of configurations. For example, as depicted in FIG. 4, the antenna 18 may be an open quad-loop consisting of a conductive structure 66. In one embodiment, the conductive structure 66 may have a width of approximately 6.35 mm (0.25 inches) and a thickness or height of approximately 0.0762 mm (0.003 inches). The length 72 and width 74 of the structure 66 is approximately 38.1 cm (15 inches) and 20.32 cm (8 inches), respectively. In this embodiment, the antenna 18 has a resonant frequency of approximately 13.5 MHz. The number of loops, and thickness or width of the conductive traces defining the antennae may also be altered. The dimensions, however, may be altered and adjusted as needed to achieve the desired resonant frequency, such as 915 MHz or 2.4 GHz. Indeed, specifically adapted antennae for operation at such frequencies are contemplated by the present invention. Moreover, antenna and decorative surfacing products in accordance with the present techniques may accommodate other frequencies and applications, such as those used in WIFI applications. These may be designated "RF" within a specific radio frequency range. However, regardless of the specific frequency, such implementations of the present technique should be considered included in the present inventive concepts.

Figure 5:
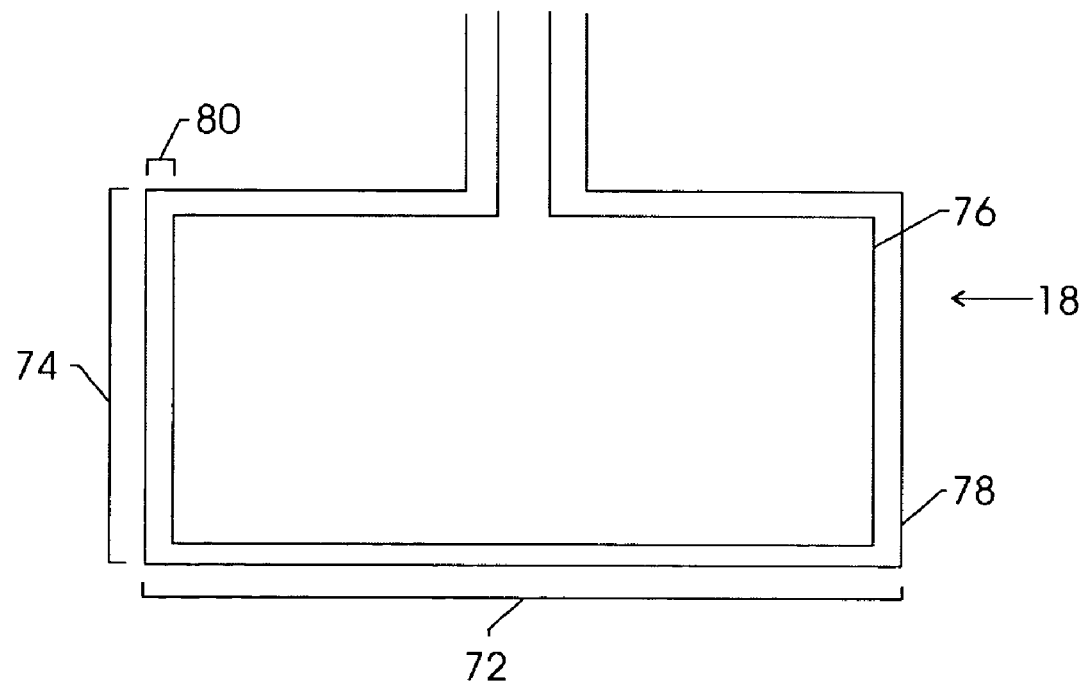
FIG. 5 is another embodiment of an antenna configuration in accordance with the present technique.

In another embodiment, as depicted in FIG. 5, the antenna 18 may be an open quad-loop consisting of an inner and outer conductive structure, 76 and 78 respectively. The outer conductive structure 78 may be similar in dimensions to the conductive structure 66 depicted in FIG. 4, with a spacing 80 of approximately 1.27 cm (0.5 inches) between the inner 76 and outer structures 78. In this embodiment, the antenna 18 has a resonant frequency of approximately 13.5 MHz though as noted above, other resonant frequencies may be achieved by simple resizing of the antenna 18. Though quad-loop structures are depicted in FIGS. 4 and 5, other open configurations of antenna 18 are also possible including circular and v-shaped configurations.

Figure 6:
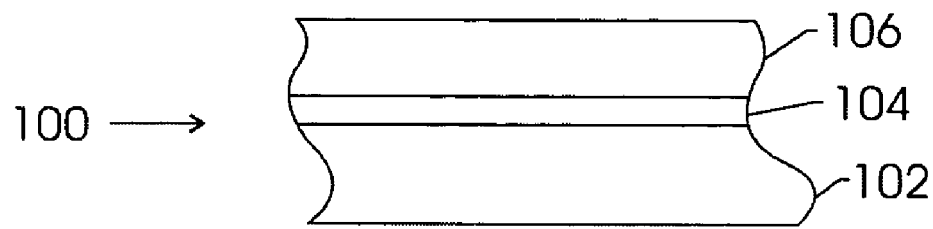
FIG. 6 is a sectional side view depicting a decorative surface incorporating an embedded RF shield in accordance with the present technique.

In addition to a laminate 40 with an integral antenna 18, it may also be desirable to create an RF shield 32 in the form of a decorative surface, such as a high pressure decorative laminate, for use with RFID systems. Such a shield 32 may be used to prevent the inadvertent reading of stray signals by reader antennas, such as antenna 18 or others. For example, in one embodiment, as depicted in FIG. 6, a shield laminate 100 comprises a first core layer 102 upon which a conductive mesh 104, such as steel mesh, is laid. The spacing in the conductive mesh 104 is close enough to prevent the passage of RF waves, thereby disrupting or blocking radio communications between a proximate RF tag 34 and a reader antenna and preventing spurious reads and registrations. In one embodiment, a wire steel mesh with a 0.1397 mm (0.0055 inch) wire diameter is employed. In another embodiment, the steel wire diameter is 0.1905 mm (0.0075 inches). A second core layer 106 may then be laid atop the conductive mesh 104 to create a decorative or functional surface. Additional core layers may be added, as needed, to produce a shield laminate 100 of the desired thickness.

Figure 7:
FIG. 7A through 7C depict a method of manufacturing the decorative surface depicted in FIG. 6.
Figure 7:
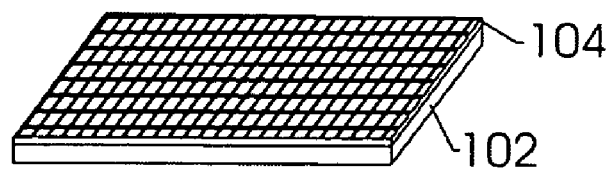
Figure 7:
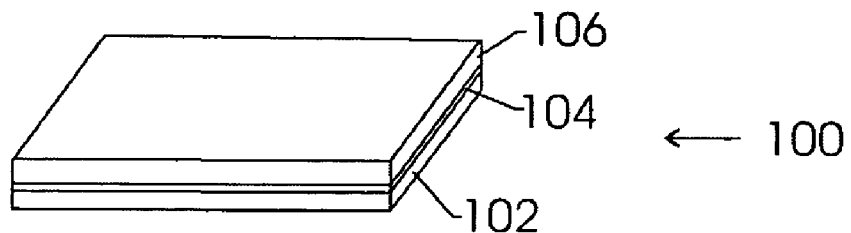

Referring to FIG. 7, steps for making the shield laminate 100 are depicted. In FIG. 7A, the first core layer 102 is depicted. The conductive mesh 104 is then laid atop the first core layer 102 in FIG. 7B. The second core layer 106 is then laid atop the steel mesh 104 in FIG. 7C. Because the conductive mesh 104 allows resin to flow through its openings, the first and second core layers 102 and 106 can bind together under heat and/or pressure to form a laminate without a binding layer being present. Though only a first and a second core layer 102 and 106, respectively, are depicted, additional core layers may be present as desired in order to achieve the desired thickness of shield laminate 100. After the desired layers and mesh have been stacked, they may be placed between plates and treated with heat and pressure, as described above, to generate the desired laminate layer 100.

Figure 8:
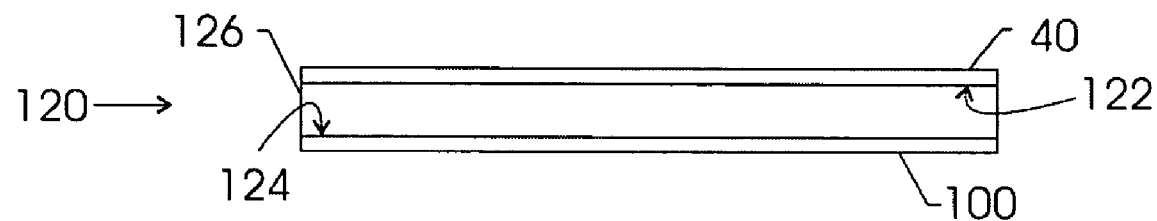
FIG. 8 is a side view of a shelf with an antenna containing laminate attached to on surface and a shield containing laminate attached to the opposing surface.

The shield laminate 100 may be used in association with any antenna to block stray RFID signals. However, in one embodiment, the shield laminate 100 is used in conjunction with the laminate 40 incorporating a printed antenna 18 to form a shelf 120 or other storage surface, as depicted in FIG. 8. In the embodiment of FIG. 8, the laminate 40 may be a decorative or functional laminate adhered to a first surface 122 of the shelf 120. Similarly, the shield laminate 100 may be adhered to the opposing surface 124 of the shelf 120. Various adhesives or epoxies may be used to adhere the laminates 40 and 100 to the shelf substrate 126. The combination of the laminates 40 and 100 incorporating an antenna and shield respectively allows shelves 120 to be created which may be vertically arranged and used in close proximity without stray RFID signals being read and registered by an antenna containing laminate 40. Alternately, a compact laminate may be formed containing both the antenna 18 printed on one layer of the laminate and the conductive mesh 104. In one embodiment, the compact laminate may range in thickness from 2 mm to approximately 2.55 cm (approximately 0.08 inches to 1.0 inch) with the conductive mesh 104 disposed at a suitable distance from the antenna 18 such that it does not substantially impact the performance of the antenna 18. In such an embodiment, the compact laminate itself may form a structural component, such as a shelf 120 or panel, as opposed to being disposed on a shelf or panel substrate 126.

Figure 9:
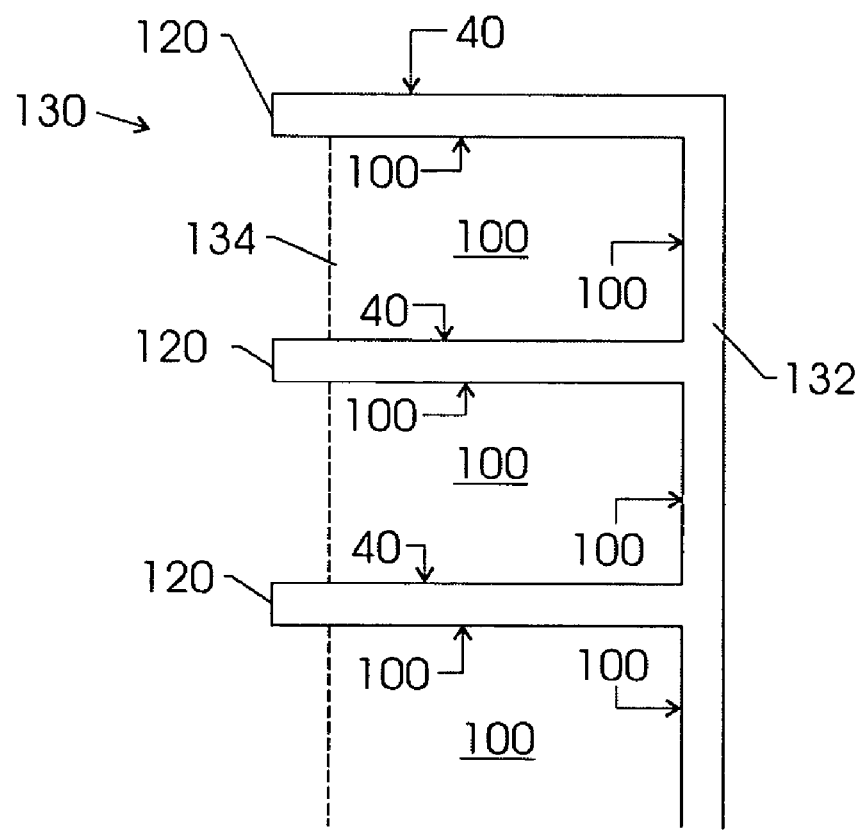
FIG. 9 is a side view of a shelf unit incorporating the shelf of FIG. 8.
Figure 10:
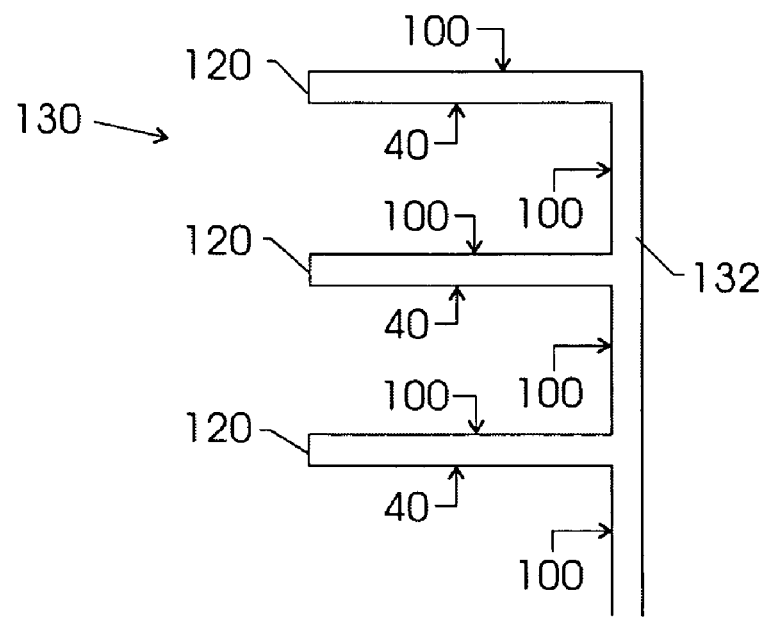
FIG. 10, is a side view of an alternate configuration of a shelf unit incorporating the shelf of FIG. 8.

For example, referring to FIGS. 9 and 10, a shelf unit 130 is depicted from the side with three shelves 120. The shelves 120 incorporate an antenna, such as a printed antenna 18 in a laminate 40, adhered to a surface of each shelf 120. Each shelf 120 also incorporates a shield laminate 100 adhered to the opposing surface such that each horizontal shelf 120 is separated from RF signals on the adjacent vertical shelf or shelves by a shield laminate 100. As depicted in FIG. 9, the shelf unit 130 may be configured such that the antenna containing laminate 40 is attached to the top surface of each shelf 120 while the shield laminate is attached to the respective bottom surface. Conversely, FIG. 10 depicts the shelf unit 130 configured with the antenna containing laminate 40 attached to the bottom surface of each shelf 120 while the shield laminate is attached to the respective top surface. Depending on the function of the shelf unit, i.e., storage, display, and so forth, one or both of the laminates 40, 100 may incorporate decorative and/or protective layers 50, 52 on their exposed surface. In addition, as depicted in FIG. 9, additional shield laminates 100 may be attached to a vertical substrate such as the back panel 132 or the side panels 134 which the shelves 120 are attached or adjacent to in order to further reduce the incidence of stray signals.

Figure 11:
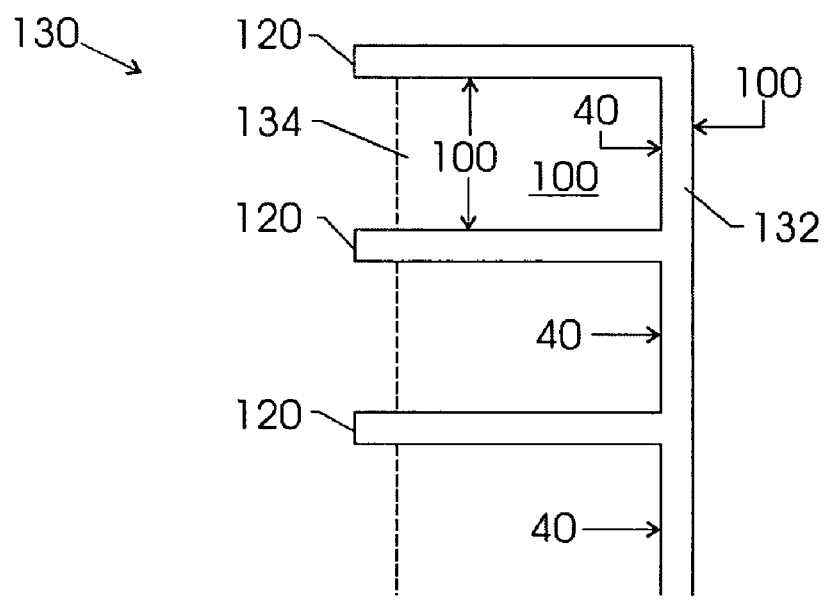
FIG. 11 is a side view of an alternate configuration of a shelf unit incorporating an antenna containing laminate and a shield containing laminate.

Alternatively, as depicted in FIG. 11, the antenna containing laminate 40 may be attached or adhered to a vertical substrate, i.e., the back panels 132 or side panels 134 in the shelf unit 130. One or more shield laminates 100 may be attached to the respective opposing face of the vertical substrate, to reduce the incidence of stray signals from adjacent shelf units. A shield laminate 100 may or may not be attached to either a top or bottom surface of the shelf units 120 to prevent stray signals between the shelves 120, as depicted in FIG. 11. As discussed above, depending on the function of the shelf unit, i.e., storage, display, and so forth, one or both of the laminates 40, 100 may incorporate decorative and/or protective layers 50, 52 on their exposed surface.

As noted above, a variety of configurations and materials may be used for forming antennae in accordance with the present techniques. For example, while high pressure decorative laminates are discussed above. The techniques may equally well be employed for low pressure laminates, or for implementations where no pressing is performed. Similarly, as noted above, the techniques may be used to form antennae on decorative coatings and sheets, such as thermal plastic and other sheet materials commonly used in the decorative services industry, and sometimes referred to as "contact paper" or "contact sheets." Such antennae may be formed by printing techniques as disclosed above, or any suitable mechanism for laying the antenna in place on the decorative sheet, typically on the rear surface of the sheet. Depending upon the frequency range and desired resistance of the antenna, these variations may dictate differences in geometry, inks, and the quantity and formulation of such inks or printing materials. In adhesive applications, such as contact sheets, an adhesive coatings may be applied over the antenna, along with a removable sheet material, such as paper or plastic, which can be removed for application of the contact sheet bearing the antenna on a desired surface, such as a shelf or panel.

The examples below illustrate various exemplary embodiments of the foregoing technique shown to produce suitable antennae for various frequency ranges. While many of the examples are designed for a frequency range or target frequency of 13.5 MHz, similar designs are contemplated for higher frequencies, particularly for 915 MHz. These higher frequencies may be particularly well-suited for use with shielding techniques such as those described above. It will also be noted through the following examples that in certain implementations, the processes employed in forming laminate structures surprisingly improves the performance of the resulting antennae by decreasing the resistivity of the conductive traces or legs of the antenna.

EXAMPLES

Exemplary antennas were prepared in accordance with the foregoing techniques by two methods. Initially, all experimental antennae were made by a stencil method. A stencil was created in the shape of an antenna by applying a low tack masking type tape, available from Duck Products of Henkel Consumer Adhesives, Inc. of Avon, Ohio, U.S.A. under the designation 30 Day Perfect Release, (see www-.duckproducts.com), to kraft paper or phenolic impregnated kraft paper. The thickness of the tape was approximately 0.0056 inches or 0.142 mm. These papers are the same type used to make the core layers of high-pressure decorative laminates. After the antenna was masked, silver conductive ink, available from Noelle Industries of Billerica, Mass., U.S.A., was applied to the antenna area. A knife-edge was then drawn across the length of the antenna. The knife-edge smoothed the ink in high spots and filled the ink into the low spots, so that an entire antenna area was evenly coated with conductive ink to a wet thickness of 0.142 mm. After the ink had been evenly spread with the knife-edge, the masking tape was removed from the paper.

It was found that allowing the masking tape to remain on the paper until after the ink was thoroughly dried could make removal of the tape difficult without pulling paper fibers from the kraft paper or disturbing the edge of the silver conductive ink antenna. The samples were allowed to air dry until the ink surface was no longer tacky to the touch. Drying time varied with environmental conditions but generally overnight drying was used on the samples.

Forced hot air drying was also used on the samples. Forced hot air drying was used without difficulties on the dry, untreated kraft. However, caution is warranted when using hot air on the phenolic treated paper, as it is possible to advance the b-staging of the phenolic resin underneath the conductive ink or near the conductive ink. Advancing the b-staging of the phenolic resin has the potential to effect bonding of that area of paper to other kraft layers or melamine impregnated layers of paper when the final high pressure decorative laminate is produced. If high-pressure laminates were produced without allowing the ink to dry sufficiently, it was found that the ink had a tendency to "bleed" or flow, which caused the edges of the lines to be less sharp or even fuzzy. With properly dried samples small amounts of flow were seen in the finished laminate. This flow was the result of the polymer binding system used in the ink. The polymer binding system did not appear to cause the silver particles to flow away from their original location if the ink was dry when the high-pressure laminates were produced.

Antennae were also produced by screen-printing. The antenna images were created on screens with mesh sizes of 200, 155, and 110. Screens made from polyester mesh were employed, which are readily available and relatively inexpensive. Silver containing inks may be somewhat abrasive to the polyester mesh and can shorten the useful lifetime of the screens. It may be advantageous to use screens made from stainless steel if extended use of the screens in this application is expected. After the imaged screens were created using standard resists, exposure, and washing techniques, the same Noelle Industries conductive ink was applied to the screen, and a rubber squeegee was used to draw the ink over the screen. Dry kraft and phenolic treated kraft papers were used to receive the ink. Samples were prepared where the ink was drawn over the screen one and two times. We found that two draws of ink gave a sharp antenna image with sufficient conductive ink coverage to provide the desired electrical conductivity. Screen-printing is ideally suited to make multiple antennae with the same geometry. The stenciling method is ideally suited to make one or a few antennae with unique geometries or those with limited budgets.

It is envisioned that antennae could also be printed by other methods such as rotogravure and flexographic printing. Both of these methods are ideally suited to make hundreds, to tens of thousands or even millions of copies of the same geometry.

Ink jet printing is an attractive method for making printed images because computer control would allow individually unique images to be printed so that one image could be printed as easily as several images of the same geometry. Today, commercial ink jet printers are not generally available that can use pigmented silver ink such as the Noelle Industries described above. While pigmented inks are sold for commercial ink jet printers those pigments are many times smaller than the silver particles found in the Noelle Industries ink. The pigments of commercial ink jet inks are also not as dense as elemental silver, i.e. 10.49 grams per cubic centimeter. While the technology for ink jet printing of silver particles suitable for this invention is not available today, it is anticipated that, ink jet technology will advance so that relatively large and dense particles like those of silver can be applied to paper and polymeric substrates. Polymeric substrates may include polyester such as Mylar, a registered trademark of E. I. DuPont De Nemours & Company of Wilmington, Del., U.S.A., polyethylene, polypropylene, styrene, styrene-maleic anhydride copolymers such as Dylark, a registered trademark of Nova Chemicals Corp. of Calgary, Alberta, Canada, regenerated cellulose, acrylics, polymers and copolymers of methyl methacrylate, polyvinyl chloride, polycarbonates, such as Hyzod, a registered trademark of Sheffield Plastics Inc. a subsidiary of Bayer A.G. of Leverkusen Germany, and polyimides, to name only a few.

Example 1

An open loop antenna as shown in figure XX was prepared by the stencil method. The antennae were 16 inches by 16 inches in a single loop. A first example had a conductor (line) width of 0.25 inches. The phenolic treated kraft sheet with the dry antenna was pressed at 1000 p.s.i. The treated kraft sheet was placed between two aluminum foil sheets and the aluminum foil was placed between two stainless steel plates. This sandwich, containing five layers, was then inserted between the platens of a conventional high-pressure laminating press as is commonly used in the industry. The platens were heated with pressurized hot water. The temperature of the platens was ramped from ambient to 273° F. rapidly and then held at 273° F. so that the total heat applied time above ambient was 22 minutes. At the end of the heating time, and while still under pressure the platens were cooled to ambient temperature. The cooling cycle lasted a total of 12 minutes. The samples were removed from the press, the stainless steel plates and aluminum foil were removed from the antenna-bearing, phenolic treated, kraft sheet.

Example 2

Prepared like example 1, except line width of 0.125 inches.

Example 3

Prepared like example 1, except line width of 0.50 inches.

Example 4

Prepared like example 1, except line width of 1.00 inches.

TABLE 1

| Example # | DC resistance before pressing | DC resistance after pressing |
| --- | --- | --- |
| 1 | 16.35 Ω | 0.926 Ω |
| 2 | 25.8 Ω | 1.011 Ω |
| 3 | 8.31 Ω | 0.622 Ω |
| 4 | 4.33 Ω | 0.375 Ω |

The DC resistance before pressing is considered to be large and would result in antennae with significant loss of energy by resistive heating. This is generally considered to be a poor antenna. DC resistance is related to the cross-sectional area of the antenna. The DC resistance after pressing is greatly reduced by at least an order of magnitude. The DC resistance after pressing is approximately 1 Ω or less, and antennae with such reduced resistance show minimal resistive heating and are generally considered to be good antennae, especially for use in 13.56 MHz applications.

To demonstrate the effect of maximum heating temperature during the press cycle, another set of examples were prepared.

Example 5

Prepared like example 1, except maximum press temperature was 239° F.

Example 6

Prepared like example 1, except maximum press temperature was 257° F.

Example 7

Prepared like example 1.

Example 8

Prepared like example 1, except maximum press temperature was 293° F.

Example 9

Prepared like example 1, except maximum press temperature was 310° F.

TABLE 2

| Example # | DC resistance before pressing | DC resistance after pressing |
| --- | --- | --- |
| 5 | 18.8 Ω | 0.830 Ω |
| 6 | 17.65 Ω | 0.820 Ω |
| 7 | 16.4 Ω | 0.926 Ω |
| 8 | 18.7 Ω | 0.707 Ω |
| 9 | 17.3 Ω | 0.910 Ω |

The measured DC resistance before pressing 17.6 Ω+/− 1.2 Ω demonstrates variations due to the measurement and/or silver ink thickness variations. After pressing at this range of temperatures the measured DC resistance is in all cases less than 1 Ω. This range of temperatures reflects a wide operating range of conditions that might be encountered while making conventional high pressure decorative laminates. One would expect that laminates prepared with silver ink-based antennae would exhibit good RF properties at 13.56 MHz.

To show the effect of pressure during the press cycle another set of examples were prepared.

Example 10

Prepared like example 1, except pressed at 1000 p.s.i.

Example 11

Prepared like example 1, except pressed at 500 p.s.i.

Example 12

Prepared like example 1, except pressed at 250 p.s.i.

Example 13

Prepared like example 1, except pressed at 1500 p.s.i.

TABLE 3

| Example # | DC resistance before pressing | DC resistance after pressing |
| --- | --- | --- |
| 10 | 16.4 Ω | 0.926 Ω |
| 11 | 27.9 Ω | 0.991 Ω |
| 12 | 15.5 Ω | 0.950 Ω |
| 13 | 20.9 Ω | 0.685 Ω |

The pressure range studied in the above examples encompasses the pressure typically used in conventional low-pressure decorative laminates, continuous press decorative laminates, and high-pressure decorative laminates. The measured DC resistance after pressing shows little variation, although the very high pressure of 1500 p.s.i. did show decreased resistance, indicating this ink system within these pressing conditions is ideally suited for making radio frequency antennae operating at 13.56 MHz.

Examples of Antenna Produced by Screen Printing

Antennae were produced with three sizes of screens, 200 mesh, 155 mesh, and 110 mesh. The antenna were screen printed with one pass of the squeegee over the image or two passes. The two passes were attempted to add an extra amount of silver ink to the antenna. To make a "two-pass" antenna, the screen was not removed from the paper between passes; the squeegee was simply drawn over the imaged area twice. After screen printing, the ink was dried, and then the substrate pressed into laminates. The press heat cycle and pressure were the same as those used in example 1.

TABLE 4

| Example # | Mesh Size | Number of Passes | DC resistance before pressing | DC resistance after pressing |
| --- | --- | --- | --- | --- |
| 14 | 200 | 1 | 440 Ω | 2.51 Ω |
| 15 | 200 | 2 | 353 Ω | 2.50 Ω |
| 16 | 155 | 1 | 62.4 Ω | 0.980 Ω |
| 17 | 155 | 2 | 63.2 Ω | 0.990 Ω |
| 18 | 110 | 1 | 58.5 Ω | 0.904 Ω |
| 19 | 110 | 2 | 50.4 Ω | 0.745 Ω |

This data shows the advantage the pressing conditions have on decreasing the DC resistance of the ink system. In the case of example 14, the resistance is decreased by over 175 times. The 200-mesh screen does not provide enough silver in the antenna to have sufficiently low resistance to be well suited for operating at 13.56 MHz. The 155 mesh and 110 mesh screens, examples 16–19, provide enough silver to make acceptable antenna operating at 13.56 MHz with the pressing conditions used to make them. Additionally the screen-printed antennae use less silver conductive ink relative to the stenciled antennae so that more favorable economics result.

Examples of Silver Conductive Ink Antenna Produced on Non-Paper Substrates

Example 20

An antenna prepared by the stencil method was formed on commercial vinyl, i.e. polyvinyl chloride, film used in the decorative surfacing industry. This vinyl film had a decorative woodgrain pattern printed on one side. The antenna was stenciled on the back or non-decorative side. After air drying, the vinyl sheet was subjected to the normal pressing conditions of Example 1. The DC resistance was measured before and after pressing.

Example 21

An antenna prepared by the stencil method was formed on a commercial film prepared from polyvinyl chloride and an acrylic polymer, this material is known as Kydex, a registered trademark of Kleerdex Company of Bloomsburg, Pa., U.S.A. This is a film product that is gaining in popularity for some decorative surfacing applications. An antenna was stenciled on the smoother side of the film. After air drying the Kydex sheet was subjected to normal pressing conditions of Example 1. The DC resistance was measured before and after pressing.

Example 21A

An antenna was prepared by the screen printing method using a 110 mesh screen with the standard Noelle industries silver conductive ink on a 6 mm thick sheet of polycarbonate material marked under the commercial designation Hyzod, a registered trademark of Sheffield Plstics of a subsidiary of Bayer A. G. of Leverkusen, Germany. After air drying, the sheet was subjected to normal pressing conditions of Example 1. The DC resistance was measured before and after pressing.

TABLE 5

| Example # | DC resistance before pressing | DC resistance after pressing |
|---|---|---|
| 20 | 10.56 Ω | 0.870 Ω |
| 21 | 6.47 Ω | 1.10 Ω |
| 21A | 19.8 Ω | 1.80 Ω |

The two film substrates were suitable for antennae operating at 13.56 MHz, while the sheet of polycarbonate were of marginal utility. The relatively low DC resistance before pressing, compared to paper substrate, may result from the silver particles disposed on the surface of the film/sheet and not penetrating into a porous paper surface. The DC resistance after pressing, while approximately the same as the examples prepared on paper, suggests the physical contact between silver particles is similar. While the DC resistance of the Hyzod-prepared antenna is not ideal, one may be willing to accept this relatively high after-pressing resistance if the characteristics of the polycarbonate sheet are needed in the end application.

Example of an Antenna Prepared on an Incompatible Substrate

Example 22

An antenna was prepared by the stencil method on Dylark (see above) film with a thickness of 0.005 inches. Dylark is a plastic film material of interest because it is compatible and bonds tightly to the phenolic kraft layers used to make high pressure decorative laminates. The use of Dylark film in laminates is discussed in U.S. Pat. No. 5,989,668, issued on Nov. 23, 1999 to Nelson et al., and Assigned to Premark Holdings. It was noticed that the conductive ink used in all examples above softened the film while the samples airdried. After completion of the air drying, it was noticed the film had puckered or distorted under and around the antenna. The antenna was pressed under the conditions of example 1. DC resistance was measured before and after pressing.

TABLE 6

| Example # | DC resistance before pressing | DC resistance after pressing |
|---|---|---|
| 22 | 26.1 Ω | 15.32 |

This example shows typical DC resistance paper values before pressing, but the after-pressing value is initially surprising. This relatively high DC resistance value after pressing is generally considered unsuitable for an antenna operating at 13.56 MHz, and probably results from the intermixing of the binder of the ink system with the Dylark film brought about by the presence of the solvent system in the ink. As the Dylark mixed with the ink system, the separation of the silver particles increased, which in turn increased the DC resistance of the antenna.

Examples on Paper for a Low Pressure Applications

Example 23

A sheet of melamine-treated, both sides, and beta-staged, solid-color, decorative paper had a stencil antenna prepared on its non-decorative surface. After air drying, the sample was pressed like example 1. The DC resistance was measured before and after pressing.

Example 24

A sheet of non-melamine treated, or dry, woodgrainprinted, decorative paper had an antenna printed on the non-decorative side by the stencil method. After air drying, the sample was pressed like example 1. The DC resistance was measured before and after pressing.

TABLE 7

| Example # | DC resistance before pressing | DC resistance after pressing |
|---|---|---|
| 23 | 34.8 Ω | 3.91 Ω |
| 24 | 40.6 Ω | 1.82 Ω |

Example 23 had an after-pressing DC resistance that is not acceptable for a loop antenna of the size in example 1 operating a 13.56 MHz. Perhaps the melamine resin flowed into the silver ink area during pressing. Flow of melamine resin during the production of high-pressure and low-pressure laminates is known in the art. If the melamine resin mixed with the silver ink, a more resistive final antenna would be expected to be produced. Melamine resins generally have very good insulating properties, so mixing a conductive silver particles into an insulating resin would not be expected to produce a low resistance product.

The DC resistance after pressing in example 24 is not considered to make a good antenna of the size in example 1 operating at 13.56 MHz. The dry, or untreated paper used in this example is porous and perhaps some of the silver particles used in the conductive ink infiltrated into the volume of the paper, which effectively increases the separation of the silver particles and thereby increases the electrical resistance.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A multi-layer surface, the surface comprising:
   a resin impregnated cellulosic layer;
   a conductive antenna printed on the resin impregnated cellulosic layer; and
   at least one additional layer overlying the antenna to form a laminate structure.

2. The structure of claim 1, wherein the antenna is disposed on the layer of substrate by stenciling or screen printing.

3. The structure of claim 1, wherein the antenna is a single loop antenna including a single trace of conductive material disposed on the resin impregnated cellulosic layer.

4. The structure of claim 1, wherein the antenna is a multiple-loop antenna including at least two parallel traces of conductive material disposed on the resin impregnated cellulosic layer.

5. The structure of claim 1, wherein the resin impregnated cellulosic layer and the at least one additional layer form a high pressure decorative laminate.

6. The structure of claim 5, wherein the decorative laminate is formed of at least one layer of phenolic impregnated cellulosic material and at least one layer of melamine impregnated cellulosic material.

7. The structure of claim 1, wherein the antenna is configured for transmitting and receiving signals at a frequency of approximately 13.5 MHz.

8. The structure of claim 1, wherein the antenna is configured for transmitting and receiving signals at a frequency of approximately 95 MHz.

9. The structure of claim 1, further comprising a shield operative with the multi-layer surface to shield interference from or to the antenna.

10. A multi-layer laminate structure comprising:
    at least one phenolic impregnated layer of cellulosic material;
    a decorative, melamine impregnated layer of cellulosic material disposed on the phenolic impregnated layer;
    a protective, melamine impregnated layer of cellulosic material disposed on the decorative layer; and
    a printed RF antenna formed at an interface between phenolic impregnated layers of the structure or between a phenolic impregnated layer and the decorative layer.

11. The structure of claim 10, wherein the layers are laminated by applying a pressure to the layers under elevated temperatures to form a laminate.

12. The structure of claim 11, wherein the laminate is a high pressure decorative laminate.

13. The structure of claim 11, wherein the laminate is a low pressure decorative laminate.

14. The structure of claim 10, wherein the antenna is configured for transmitting and receiving signals at a frequency of approximately 13.5 MHz.

15. A multi-layer shelf, comprising:
    a shelf substrate;
    a first laminate structure attached to a first surface of the shelf substrate, wherein the first laminate structure comprises a resin impregnated cellulosic layer, a conductive antenna printed on the resin impregnated cellulosic layer, and at least one additional layer bonded to the resin impregnated cellulosic layer such that the antenna is covered.

16. The shelf of claim 15, further comprising a second laminate structure attached to an opposing surface of the shelf substrate, wherein the second laminate structure comprises a third layer, a conductive mesh, and a fourth layer bonded to the third layer such that the conductive mesh is between the third and fourth layers.

17. The shelf of claim 16, wherein the conductive mesh forms a shield interference to or from the antenna.

18. The shelf of claim 15, wherein the first laminate structure comprises at least one phenolic impregnated cellulosic layer and at least one melamine impregnated layer.

19. The shelf of claim 15, wherein the antenna is configured to receive signals at a radio frequency.

20. The shelf of claim 15, wherein the antenna is configured to receive signals at a frequency of approximately 13.5 MHz.

21. The shelf of claim 15, wherein the antenna is configured to receive signals at a frequency of approximately 915 MHz.

22. A method for making a multi-layer structure, comprising:
    disposing a fluid on a first layer to form a conductive antenna;
    placing one or more resin impregnated cellulosic layers on the first layer such that the antenna is covered to form a stack; and
    applying one or more of heat and pressure to the stack to bond the first layer and the one or more resin impregnated cellulosic layers.

23. The method of claim 22, wherein the fluid is an ink and is disposed on the first layer via a printing process.

24. The method of claim 22, comprising curing the conductive antenna prior to placing the one or more resin impregnated cellulosic layers on the first layer.

25. The method of claim 22, wherein the first layer is a phenolic impregnated cellulosic layer.

26. The method of claim 22, wherein the first layer is a phenolic impregnated layer and at least one of the resin impregnated cellulosic layers is a melamine impregnated layer.

27. The method of claim 22, wherein the antenna is printed by stenciling or screen printing.

28. The method of claim 22, wherein the antenna is printed with a silver-containing ink.

29. A method for making a laminate structure comprising:
    printing a conductive antenna on a phenolic impregnated layer;

disposing at least a melamine impregnated layer on the phenolic impregnated layer; and applying one or more of heat and pressure to the layers to bond the layer to one another with the conductive antenna therebetween.

30. The method of claim 29, comprising disposing a second phenolic impregnated layer between the phenolic impregnated layer and the melamine impregnated layer such that the conductive antenna is disposed between the two phenolic impregnated layers.

31. The method of claim 29, wherein the conductive antenna is cured prior to disposing the melamine impregnated layer thereon.

32. The method of claim 29, wherein the layers form a high pressure decorative laminate following the application of elevated pressure and elevated temperature to the layers.

33. The method of claim 29, wherein the layers form a low pressure decorative laminate following the application of elevated pressure and elevated temperature to the layers.

34. A method for making a multi-layer structure, comprising:

printing a conductive RF antenna on a substrate layer;

disposing the substrate layer between at least two additional layers, wherein at least one of the additional layers comprises a resin impregnated cellulosic layer; and applying pressure to the layers under elevated temperatures to form a laminate structure.

35. The method of claim 34, wherein the substrate layer comprises a phenolic impregnated layer.

36. The method of claim 34, wherein at least one of the additional layers comprises a phenolic impregnated layer.

37. The method of claim 34, wherein the substrate layer comprises a melamine impregnated layer.

38. The method of claim 34, wherein at least one of the additional layers comprises a melamine impregnated layer.

39. The method of claim 34, comprising curing the conductive antenna prior to placing the one or more additional layers on the substrate layer.

40. The method of claim 34, wherein the antenna is printed by stenciling or screen printing.

41. The method of claim 34, wherein the laminate structure comprises at least one resin impregnated cellulosic layer and at least one melamine impregnated layer.

42. The method of claim 34, wherein the layers form a low pressure decorative laminate following the application of elevated pressure and elevated temperature to the layers.

43. The method of claim 34, wherein the layers form a high pressure decorative laminate following the application of elevated pressure and elevated temperature to the layers.

* * * * *